Dec. 11, 1962     G. V. KULLGREN     3,067,462
EXTRUDER FOR DRYING SYNTHETIC RUBBER
Filed June 10, 1959     2 Sheets-Sheet 1

INVENTOR.
GILBERT V. KULLGREN
BY
ATTORNEYS.

Dec. 11, 1962  G. V. KULLGREN  3,067,462
EXTRUDER FOR DRYING SYNTHETIC RUBBER
Filed June 10, 1959  2 Sheets-Sheet 2
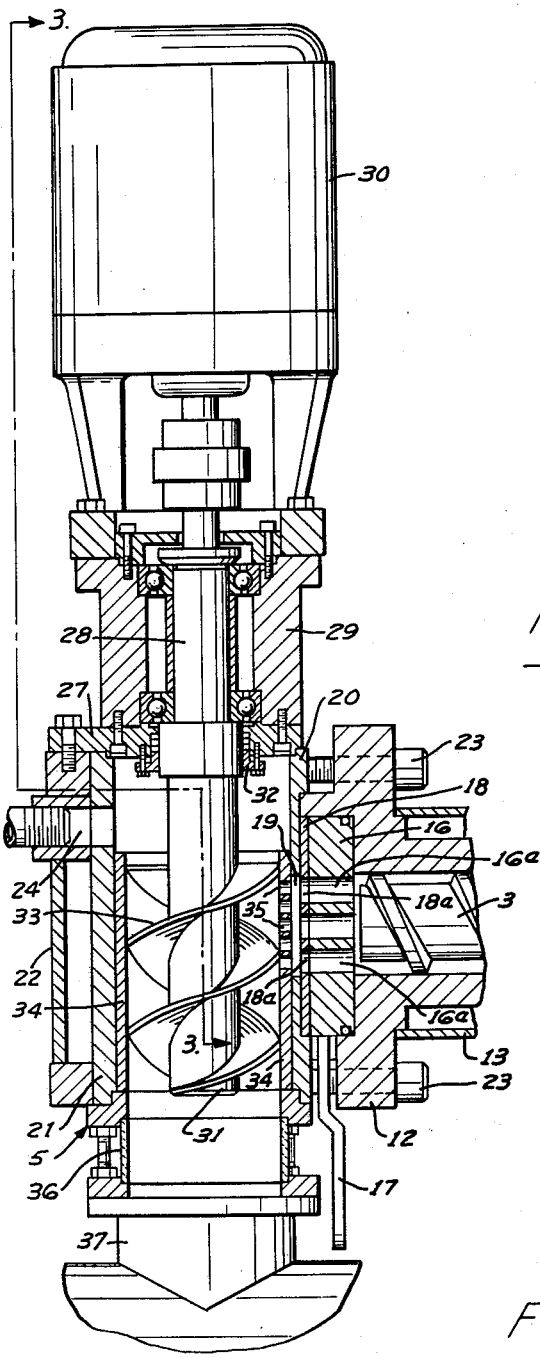
Fig. 2.
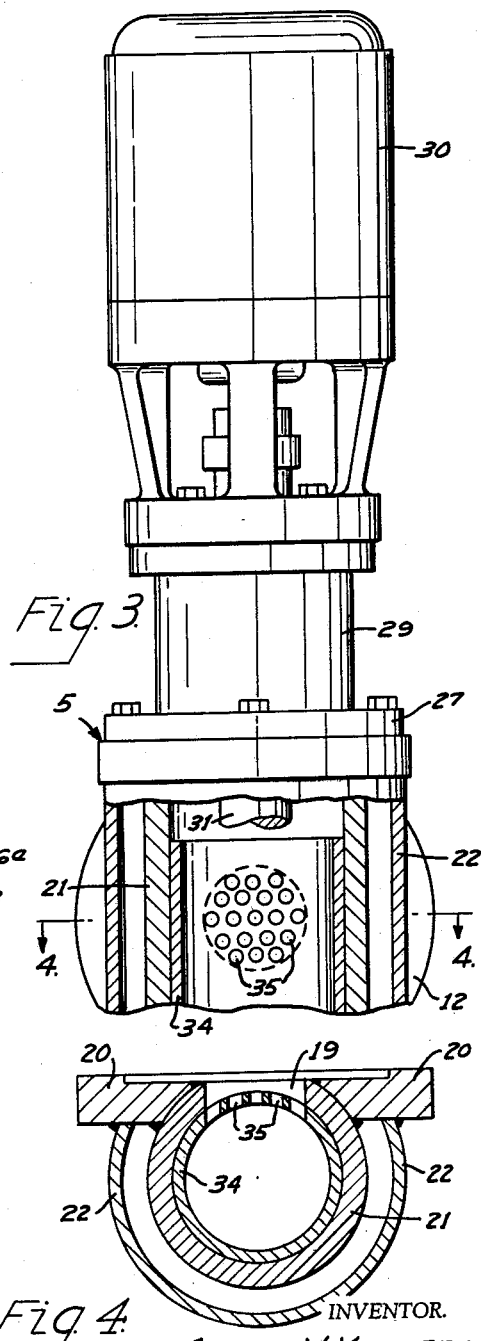
Fig. 3.
Fig. 4.
INVENTOR.
GILBERT V. KULLGREN
BY
ATTORNEYS.

United States Patent Office 3,067,462
Patented Dec. 11, 1962

3,067,462
EXTRUDER FOR DRYING SYNTHETIC RUBBER
Gilbert V. Kullgren, Akron, Ohio, assignor to Blaw-Knox Company, Pittsburgh, Pa., a corporation of Delaware
Filed June 10, 1959, Ser. No. 819,449
3 Claims. (Cl. 18—12)

This invention relates to apparatus for drying particulate materials in the form of crumbs, especially emulsion polymer crumbs.

Emulsion polymerization yields products that commonly entrain large quantities of liquid. Not only does the liquid tend to cling to the exposed surfaces but because of the crumb-like nature of the product, it tends to become mechanically trapped in substantial amounts within the product. For these reasons, removal of the liquid by such operations as screening, filtering and the like is usually only partly effective. In consequence, emulsion polymer crumbs generally require further treatment to free them of entrained liquid, which at times may amount to as much as 60% of the weight of the crumbs.

The principal object of the present invention is to provide improved apparatus for removing such liquid.

According to the invention, such further treatment, at least in its preferred form, comprises the steps of expressing the liquid from the crumbs in a compression zone under conditions tending to produce a material increase in the crumb temperature; drawing off the expressed liquid; supplying heat from an extraneous source to the crumbs; and extruding the heated crumbs into a decompression zone characterized by temperatures and a vacuum high enough to bring about vaporization of practically all of the retained liquid. If desired, the extruded product may be reduced to the form of flakes, chips, or pellets either before, simultaneously with, or after the vaporization or drying step. Generally, the flakes, chips, or pellets will be subjected to a further compression step, as in extrusion apparatus, to masticate and/or consolidate them preparatory to shipment.

Although the apparatus employed for expressing the liquid from the crumbs may take other forms, preferably it takes the form of an extruder designed to continuously receive, compress and discharge the moist crumbs. Coupled to the extruder at its discharge end is a throat maintained under super-atmospheric temperatures and sub-atmospheric pressures. Notwithstanding its elevated temperature, which is far above ordinary room temperature, this throat constitutes a convenient place in which to accomplish reduction of the first-stage extrusion product to the form of chips, flakes or pellets.

It is usually economically advantageous to be able to ship the product in consolidated form rather than in the form of chips, flakes or pellets, which tend to be bulky. Accordingly, it is often desired to couple to the previously mentioned throat means of some kind for consolidating the product immediately or almost immediately after completion of the drying operation. In what is presently regarded as the preferred embodiment of the invention, such means take the form of a second extruder from which the dried product is continuously discharged in the form of a solid strip, with or without associated cut-off means.

Other objects, advantages and features of the invention will be apparent from the description which follows and from the accompanying drawings, in which:

FIGURE 2 is a section with parts in elevation through a portion of the apparatus shown in FIGURE 1.

FIGURE 3 is a generally similar view on line 3—3 of FIGURE 2.

FIGURE 4 is a horizontal section on line 4—4 of FIGURE 3.

Figure 1:
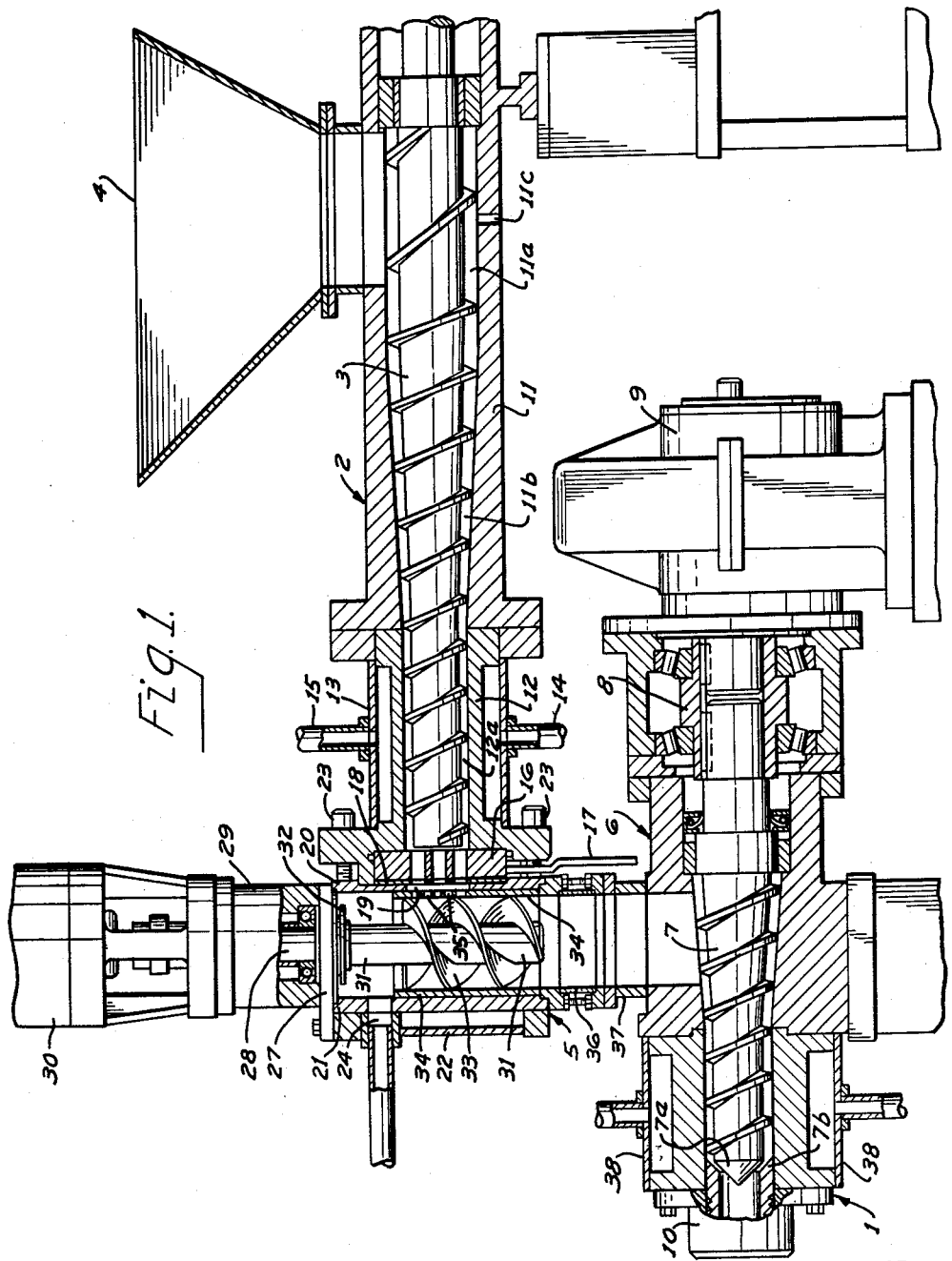
FIGURE 1 is a section with parts in elevation through apparatus of a kind that may be used in the practice of the invention.

Although enlarged as compared with FIGURE 1, FIGURES 2, 3 and 4 are on a scale less than one-half of full scale.

In FIGURE 1 is shown the apparatus as a whole, which is designated 1. Forming part of the apparatus is a motor-driven first stage extruder 2. The motor, which may take the form of a conventional heavy-duty electric motor, does not appear in FIGURE 1. The extruder is provided as shown with a tapered extrusion screw 3 to which emulsion polymer crumbs such as crumbs of butyl rubber are fed through hopper 4.

From the first-stage extruder, the consolidated product proceeds into a closed chamber, generally designated 5, which in the form of the invention shown is shaped as a throat. In such throat, the first-stage extrusion product is converted into flakes, chips or pellets. This conversion into flakes, chips or pellets will be referred to hereinafter as comminution, notwithstanding the fact that, as a rule, the product is not so finely divided as to take the form of a powder.

After leaving the zone in which the comminution step is performed, the comminuted product proceeds to a second-stage extruder 6. The centerline of the latter may but need not necessarily parallel the centerline of first-stage extruder 2, as represented in FIGURE 1. Like extruder 2, extruder 6 is provided with a tapered extrusion screw 7 driven through suitable coupling means 8 from an electric motor 9. At the discharge end of extruder 6, the consolidated product of the second extrusion stage is forced through a conventional extrusion head 10 equipped with a suitable die (not shown) which gives the product the desired cross-section, circular or non-circular.

From FIGURE 1 is will be seen that first-stage extruder 2 is made up of a long first section 11 and a short second section 12. The hollow interior of long section 11 consists of a cylindrical chamber 11a and a tapered chamber 11b. Cylindrical chamber 11a is provided directly below hopper 4 with a drain 11c for the removal of the liquid expressed in chambers 11a and 11b. The hollow interior of short section 12 is characterized by a cylindrical chamber 12a of substantially the same diameter as the minimum diameter of tapered chamber 11b. Extrusion screw 3, which is located in chambers 11a, 11b and 12a, conforms in shape to them by having two generally cylindrical portions separated by a tapered portion.

In a typical case, up to 90% of the liquid in the crumbs will be expressed from the crumbs in extruder 2.

It will be noted that as a result of its shape, particularly where it is tapered to conform to the tapered shape of chamber 11b, extrusion screw 3 performs mechanical work on the crumbs. Mechanical working of the crumbs intrinsically tends to produce increases in crumb temperatures; e.g., from room temperatures to temperatures of about 200 F., depending in part on the chemical nature of the crumbs and in part on the presence or absence of plasticizing oils and/or pigments such as carbon black. To augment this elevation of temperature, short section 12, at least in the form of the invention shown in FIGURE 1, is provided with a jacket 13 and means 14, 15 for admitting and withdrawing a suitable heating medium such as hot water, hot gas, steam or the like. Depending on the chemical nature of the crumbs, crumb temperatures may be allowed to go as high as 325° F. or more as a result of this application of extrinsically-supplied heat. Under such conditions, the compressed crumbs are more readily consolidated into a compact mass by extrusion screw 3.

At the outboard end of first-stage extruder 2 is a rotary disk valve 16 provided with openings 16a for controlling the back pressure within the extruder. Valve 16, which is operated by means of a handle 17, is designed to cooperate with a parallel stationary plate 18 provided with openings 18a. Openings 16a and 18a may or may not be of the same size, shape and number. When they are completely out of registry with each other, all discharge from the extruder is of course cut off. By varying the position of valve 16 between the indicated extremes, meanwhile keeping the registry partial, the operator can effectively control the pressure under which the first-stage extrusion product is discharged.

As noted, the first-stage extrusion product leaves extruder 2 in compact form. It proceeds into an aligned circular passageway 19 in an adjacent vertical plate 20: see FIGURES 2 and 4. Passageway 19, which extends through main wall 21 of throat 5, directs the product into the chamber within the throat. As best appears from FIGURE 4, main wall 21 of throat 5 is welded to plate 20. The jacket 22 which surrounds main wall 21 likewise is welded to plate 20. As shown in FIGURES 1 and 2, plate 20 is held by screws 23 to the outboard end of first-stage extruder 2.

It is in order to maintain temperatures within an overall range between something not much less than 300° F. and something not much more than 350° F. (within which range the moisture entrapped in a typical emulsion polymer can be vaporized under a vacuum of 26 to 28 inches of mercury) that throat 5 is provided with jacket 22. The latter is equipped with connections (not shown) for admitting and removing a suitable heating medium. As indicated in FIGURE 2, throat 5 is further provided with means 24 for communicating with a vacuum pump (not shown) by which air and the vaporized moisture may be withdrawn.

At the upper end of throat 5 is a closure plate 27 which is supported by and held rigidly to main wall 21. In a suitable central opening in plate 27 is a vertical shaft 28 that is adapted to turn in anti-friction bearings forming part of a bearing section 29 overlying plate 27. Shaft 28, which is driven by an overhead electric motor 30, is supported on bearing section 29 in the manner shown in FIGURE 2. The depending lower end 31 of shaft 28; i.e., that portion which extends downward below plate 27, is surrounded by a suitable shaft seal 32 preventing the entry of contaminants, including air, into throat 5. The depending portion of the shaft carries a helical knife 33 which, in the form of the invention shown, is characterized by two interfitting flights. The edges of helical knife 33 are in scraping engagement with the inside face of a cylindrical metal liner 34 within main wall 21 of throat 5.

Because of the cylindrical shape of liner 34, it is inadvisable to use a flat breaker plate where passageway 19 enters throat 5. Although a suitably shaped breaker plate could be inserted in a suitable opening formed for the purpose in liner 34, it is advantageous to form the breaker plate as an integral part of liner 34. Accordingly, the breaker plate is physically incorporated in the liner by providing openings 35 in the liner through which the first-stage extrusion product can enter the throat. Openings 35 can readily be formed in a suitably located portion of liner 34.

By the time the first-stage extrusion product is discharged into the interior of liner 34, it takes the form of a plurality of streams, each substantially continuous. The two flights on helical knife 33 sever these streams into flakes, chips or pellets, depending on the shape of openings in liner 34. This is the comminution stage. The comminuted product is urged downward by gravity and helical knife 33. In the meanwhile, it is dried and freed of air under the pressure and temperature condition obtaining in throat 5.

Below throat 5 is a cylindrical sight glass 36 which not only permits observation of the chips, flakes or pellets passing into second-stage extruder 6 but also introduces a delay or dwell stage during which the flakes, chips or pellets continue subject to the action of temperature-pressure factors in throat 5. When the apparatus as a whole is being assembled, the length of this dwell stage may be varied by introducing a long or short sight glass. From sight glass 36 the dried flakes, chips or pellets drop into the top opening in an upright collar 37 that serves as the hopper of second-stage extruder 6.

By this time, the moisture content of the flakes, chips or pellets will usually have been reduced to something less than one-half of one percent; e.g., 0.1%, particularly if, being thin, they are characterized by a large surface area per unit of mass.

Second stage extruder 6, which seals the system against the entry of air at this point, is largely conventional in construction. It converts the dried flakes, chips or pellets into more compact form and, if desired, can be used to plasticize them as it does so. If used for purposes of plasticization, extrusion screw 7 should be equipped with a conical valve 7a cooperating with a valve seat 7b, one or the other being adjustable to vary the size of the orifice between them. As will be apparent from the shape of extrusion screw 7, the flakes, chips or pellets are mechanically worked and drastically compressed as they are urged from right to left, seen as in FIGURE 1; however, temperatures in extruder 6 may be kept below 200 to 250° F. by supplying a suitable coolant to jacket 38.

The second-stage extrusion product may be shipped in bales in substantially the form in which it emanates from the die in extrusion head 10; however, in many cases means will be provided at this point for severing it into slugs of convenient length.

In a representative test of the apparatus on emulsion polymer crumbs at a temperature of 72° F., first-stage extruder 2 was so operated as to develop an extrusion screw speed of 24 r.p.m. The highest temperature in jacket 13 was 355° F. The temperature of the stock leaving chamber 12a of section 12 was 325° F. With valve 16 approximately 75% closed, a back pressure of 450 lbs. per sq. in. (gauge) was developed. In throat 5, the highest jacket temperature was 354° F. The vacuum was equivalent to 26" of mercury. The speed of helical knife 33 was 3600 r.p.m. In second-stage extruder 6, extrusion screw 7 was operated at a speed of 50 r.p.m. The temperature in jacket 38 was 115° F. The temperature of the stock leaving the second-stage extrusion was 205° F. Its moisture content was 0.37%.

In a representative test on butyl rubber crumbs at a temperature of 72° F. having an initial moisture content of 26.3%, first-stage extruder 2 was operated with extrusion screw 3 turning at 23 r.p.m. The temperature in jacket 13 was 365° F. With the valve 16 approximately 75% closed, a back pressure of 400 lbs. per sq. in, (gauge) was developed. The temperature of the crumbs at the small end of extrusion screw 3 was 305° F. In throat 5, a vacuum was developed which varied between 24.2 and 26.4 in. The highest temperature in jacket 22 was 365° F. The speed of helical knife 33 was 2750 r.p.m. In second-stage extruder 6, extrusion screw was rotated at a speed of 64 r.p.m. The temperature in jacket 38 was 60° F. The temperature of the second-stage extrusion product was 245° F. It was found to have a moisture content of 0.1%.

In still another representative run on crumbs of synthetic rubber of the type commonly identified as GR-S, first-stage extruder 2 was operated with extrusion screw 3 rotating at 23.7 r.p.m. The highest temperature in jacket 13 was 335° F. Valve 16 was 40% closed, giving a back pressure of 350 lbs. per sq. in. (gauge). The output temperature of the first-stage extrusion product varied between 305 and 317° F. In throat 5, which was under a vacuum of 26.3", helical knife 33 operated at 1860 r.p.m. In second-stage extruder 6, extrusion screw 7 was operated at a speed of 57 r.p.m. A temperature of 212° F. was maintained in jacket 38. The moisture content of the second-stage extrusion product was approximately 0.53%. Apparently 98% of the entrained water present in the moist rubber crumbs supplied through hopper 4 had been removed.

From the foregoing it will be apparent that the invention has to do with the elimination of liquids, particularly water, from particulate materials characterized by a high content of entrained liquid. In its preferred form, it involves expressing from the material as much of the liquid as possible, heating the material to a point short of temperatures known to induce chemical decomposition of material, and causing most of the remaining liquid to flash off in the form of vapor under suitable temperature-pressure conditions. Preferably, the stock being treated is comminuted at a stage in which maximum benefit can be obtained by application of the flashing off technique to a material characterized by a high surface-weight ratio; e.g., thin flakes. After a dwell period, the purpose of which is to give the flashing off operation time to proceed to completion, the dried product is passed to apparatus designed to prepare it for shipment.

The material so processed may be any one of a wide variety of substances; however, so far the process and apparatus of the invention have been found to be of maximum utility in connection with the de-watering of emulsion polymer crumbs. Included among the materials that may advantageously be treated in this manner are various synthetic and natural rubbery products, among them those already mentioned. Vistanex is a representative example. In addition, various plastics of synthetic origin, among them many of the polymers and copolymers of the vinyl family, may be processed in the same or analogous fashion. Reclaimed rubber, particularly rubber that for one reason or another has been wetted out, may likewise be treated by the process and apparatus of the invention.

From the standpoint of both process and apparatus, changes within the skill of those versed in the art may readily be made. Thus times, temperatures, pressures and like details of the process may be varied over a wide range, subject only to the effects of factors that tend to detract from the usefulness of the process and apparatus; e.g., factors tending to produce undesirable reactions. The design details of the apparatus can likewise be varied within wide limits, as, for example, by elaboration of the decompression zone to incorporate a conveyor increasing the effective length of the dwell stage.

It is intended that the patent shall cover, by summarization in appended claims, all features of novelty residing in the invention.

What is claimed is:

1. Drying apparatus comprising a first extruder; a second extruder; means forming a throat coupling the two extruders together; means forming a first passageway through which the first extruder can discharge into the throat; means for heating the throat; means for removing moisture vapor from the throat; mechanism within the throat for comminuting material discharged by the first extruder, said mechanism comprising
    (a) a cylindrical liner,
    (b) means forming openings in a portion of said liner in alignment with said first passageway to enable such portion to serve as a breaker plate, and
    (c) rotary slicing means in scraping engagement with such breaker plate;
and means forming a second passageway through which the throat can discharge into the second extruder.

2. Drying apparatus according to claim 1 wherein the slicing means take the form of a helical knife.

3. Drying apparatus according to claim 2 wherein the knife is characterized by a plurality of interfitting flights of helical shape.

References Cited in the file of this patent

UNITED STATES PATENTS

| | | |
|---|---|---|
| Re. 23,948 | Fuller | Feb. 15, 1955 |
| 66,277 | Ames | July 2, 1867 |
| 2,078,565 | Durst et al. | Apr. 27, 1937 |
| 2,142,983 | Thurman | Jan. 3, 1939 |
| 2,640,033 | Marshall | May 26, 1953 |

FOREIGN PATENTS

| | | |
|---|---|---|
| 421,860 | Great Britain | Jan. 1, 1935 |